2 Sheets—Sheet 1

J. HOFFMAN.

Assignor to J. RECKENDORFER.

Lead and Crayon Holder.

No. 8,967. Reissued Nov. 18, 1879.

Witnesses:

George

D. A. Cowl

Inventor:

Joseph Hoffman, by H. Bailey his Atty.

2 Sheets—Sheet 2.

J. HOFFMAN.

Assignor to J. RECKENDORFER.

Lead and Crayon Holder.

No. 8,967. Reissued Nov. 18, 1879.

Witnesses:

Georgii

D P Lowe

Inventor:

Joseph Hoffman, by H Bailey his Atty.

UNITED STATES PATENT OFFICE.

JOSEPH HOFFMAN, OF NEW YORK, N. Y., ASSIGNOR TO JOSEPH RECKENDORFER, OF SAME PLACE.

IMPROVEMENT IN LEAD AND CRAYON HOLDERS.

Specification forming part of Letters Patent No. 215,521, dated May 20, 1879; Reissue No. 8,967, dated November 18, 1879; application filed October 22, 1879.

DIVISION A.

*To all whom it may concern:*

Be it known that I, JOSEPH HOFFMAN, of the city, county, and State of New York, have invented certain new Improvements in Lead and Crayon Holders, of which the following is a specification.

My invention relates to that class of pencil or lead and crayon holders in which clamping-jaws within a sheath or sleeve are contracted or closed upon the lead placed between them by the movement longitudinally of the one part relatively to the other.

I combine with the jaws and the inclosing sheath or sleeve a spring, which acts to retract the jaws, the latter when so retracted being acted on by the sheath to close or contract.

The jaws or lead-containing tube, on the front end of which they are mounted, can be pressed forward by hand against the stress of the spring. When so moved the jaws relax and release the article held by them; but the moment the pressure is relieved the spring at once reacts and draws back the jaws, with the effect of closing them upon the lead. Pressure on the point of the lead, which takes place when the pencil is used for writing or other purposes, acts only to still further tighten the hold of the jaws on the lead.

The nature of my invention and the manner in which the same is or may be carried into effect will be readily understood by reference to the accompanying drawings, in which—

Figure 1:
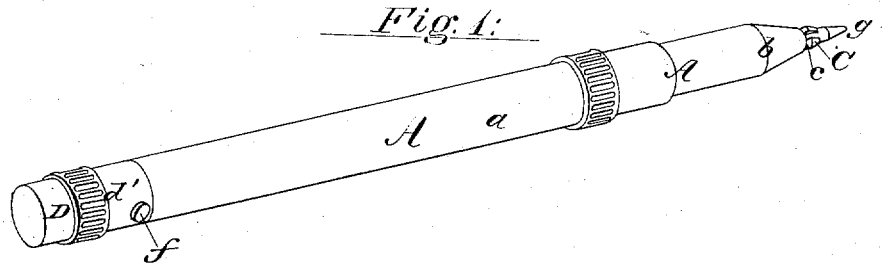
Figure 2:
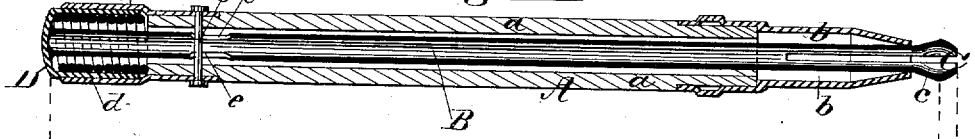
Figure 3:
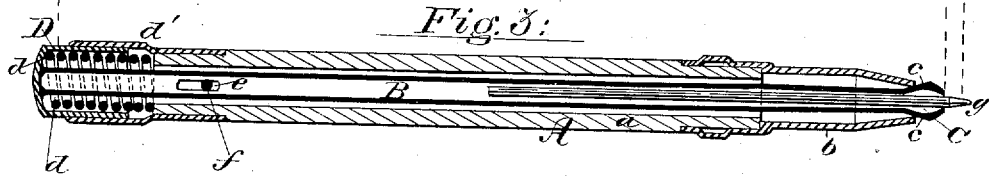
Figure 4:
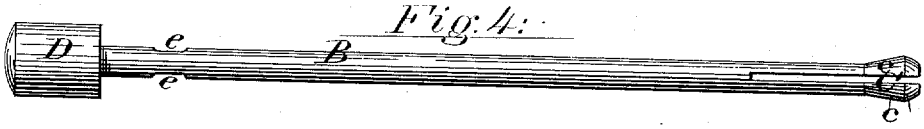

Figure 1 is a perspective view of the holder. Fig. 2 is a longitudinal central section of the same with the jaws expanded. Fig. 3 is a like section in a plane at right angles to the plane of section in Fig. 2. Fig. 4 is a view of the inner tube or stem and its accessories detached.

A is the external sheath or handle of the pencil-holder, made of wood, metal, or any other suitable material. In the present instance it is formed of a wooden tubular body, *a*, with a tapering or contracted metal tip, *b*. Within the sheath is the lead-containing tube or receiver B, carrying at its front end clamping-jaws C, which, in this instance, are formed in one piece with the metal tube B. The jaws, at their front, are constructed to nip or bite the article placed between them, and are formed externally with a taper or inclined part, *c*, the taper being from front to rear, as shown. The front ends of the jaws, when in proper position in the sheath, protrude beyond the same, and the parts are so proportioned that when the lead is placed between the jaws and the latter are retracted, the contracted front end of the sheath, acting on the inclines *c*, will cause the jaws to close upon the lead tightly.

Encircling the upper or rear portion of the tube or stem B is a spiral or other suitable spring, *d*, which, at its front, bears against a shoulder in the sheath, and at its rear against a shoulder or stop on the stem B, the said shoulder or stop in this instance being the head of a cap, D, fixed on the end of the stem, and adapted to fit and work back and forth in the rear end of the sheath. This end of the sheath is preferably provided for this purpose with a metal ferrule or collar, *d'*. The parts are held together by a pin, *f*, which extends from side to side of the sheath and passes through a longitudinal slot, *e*, in the stem B, of sufficient length to permit the requisite range of movement of the stem.

In lieu of the pin-and-slot connection, I can employ any other suitable means for connecting the parts which will permit the lead-holding tube to have the requisite range of movement—as, for instance, I can provide the cap D, around its lower or front edge, with a bead, and bend the upper end of the ferrule *d* inwardly to form a retaining-flange, which, by meeting the bead, will hold the cap in place in the ferrule.

By pressing on the head or cap D the stem will be pushed forward against the stress of the spring *d*, as seen in Fig. 2, thus forcing the jaws out. The jaws have a spring action, and normally stand open or apart, and consequently, when moved forward, they at once expand, and so release the lead *g*. When pressure on the head is removed the spring at once expands, and in so doing retracts the jaws, contracts them, and causes them to take tight hold of the lead, as shown in Fig. 3.

It will be seen that when the pencil is in use pressure on the point of the lead will tend only to still further contract the jaws, and thus tighten their hold.

Figure 5:
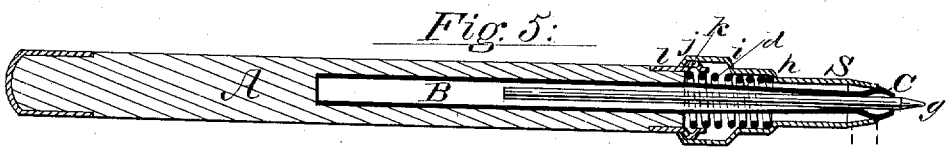
Figure 6:
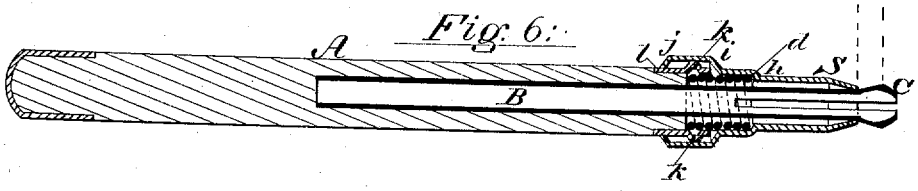

Instead of placing the spring *d* in the rear or upper end of the holder, I can place it nearer the point. Such an arrangement is shown in Figs. 5 and 6 of the drawings, which represent longitudinal central sections of the holder with the jaws expanded in the one case and contracted in the other. In this modification the spring *d* is confined between the front end of the sheath or handle A and a shoulder or stop, *h*, on the sleeve S, which sleeve is the same in form as the contracted front end of the sheath shown in the preceding figures, but in this instance is longitudinally movable with respect to the sheath, the extent of its movement being determined by its shoulders *i j*, one of which, at either extreme of movement, brings up against the bead or flange *k* on a ferrule, *l*, fitting on the front end of the sheath. The lead-containing tube or receiver B, with its spring clamping-jaws, in this instance, is fast to the sheath. The spring *d* acts to force the sleeve S and the jaws in contact, in order to close said jaws upon the lead *g*. To release the lead, all that is needed is to draw back the sleeve, or, in other words, to push forward the sheath, so as to protrude the jaws from the sleeve.

The particular construction and arrangement of the device shown in Figs. 5 and 6 is made the subject of "Division B" of this reissue. The said device is, however, here shown, in order that the scope of the invention here claimed may be better defined and ascertained.

What I here claim, and desire to secure by Letters Patent, is—

1. In a lead or crayon holder, the combination of the clamping case or sleeve, the expanding jaws tapered or provided with inclines, acted on by the case or sleeve to produce the closing of the jaws, the lead-containing tube or receiver carrying said jaws, and longitudinally movable with respect to the case or sleeve, and the spring, the combination being and acting as set forth.

2. The combination of the case, the expanding jaws tapered or provided with inclines, as set forth, the longitudinally-movable lead-holding tube or receiver carrying said jaws, and provided with a head or cap projecting from the rear of the case, and the retracting-spring, the combination being and acting as set forth.

In testimony whereof I have hereunto set my hand this 18th day of October, A. D. 1879.

JOSEPH HOFFMAN.

Witnesses:
C. S. BRAISTED,
JOE W. SWAINE.